United States Patent [19]

Umeda et al.

[11] Patent Number: 5,444,443

[45] Date of Patent: Aug. 22, 1995

[54] SOUND SOURCE DETERMINING SYSTEM

[75] Inventors: Misao Umeda, Yokohama; Keiichi Ishikawa, Tochigi, both of Japan

[73] Assignee: Ishikawa Manufacturing Co., Ltd., Chigi, Japan

[21] Appl. No.: 169,650

[22] Filed: Dec. 20, 1993

[30] Foreign Application Priority Data

Sep. 8, 1993 [JP] Japan .................................. 5-223671

[51] Int. Cl.⁶ ............................................. G08G 1/01
[52] U.S. Cl. .................................... 340/933; 367/123
[58] Field of Search ...................... 340/933, 945, 947; 367/45, 38, 99, 118, 124, 123, 126, 127, 129, 901, 906

[56] References Cited

U.S. PATENT DOCUMENTS

| | | | |
|---|---|---|---|
| 3,855,571 | 12/1974 | Massa | 367/990 |
| 4,322,828 | 3/1982 | Hoff et al. | 367/136 |
| 4,352,167 | 9/1982 | Hashimoto et al. | 367/127 |
| 4,559,642 | 12/1985 | Miyaji et al. | 367/123 |
| 4,630,246 | 12/1986 | Fogler | 367/124 |
| 4,811,308 | 3/1989 | Michel | 367/124 |
| 4,975,886 | 12/1990 | Ellingson | 367/124 |
| 5,309,409 | 5/1994 | Jones et al. | 367/123 |

*Primary Examiner*—Brent Swarthout
*Attorney, Agent, or Firm*—Dickstein, Shapiro & Morin

[57] ABSTRACT

Provided is a sound source determining system which can accurately and economically identify the position of aircraft in an airport or the like. The direction of a sound source is determined by arranging a plurality of acoustic sensors (S0, S1, S2, S3, ..., S-1, S-2, S-3, ...) in an array at a prescribed interval for detecting an acoustic signal produced from the sound source, connecting a plurality of delay circuits (D0, D1, D2, D3, ..., D-1, D-2, D-3, ...) having delay times which are different from one to a next by a unit time period ($\tau$) to the outputs of the acoustic sensors, adding up the outputs of the delay circuits in an adder circuit (AD), and determining the direction of the sound source according to the unit time period ($\tau$) which will maximize the output of the adder circuit.

10 Claims, 13 Drawing Sheets

SOUND SOURCE DETERMINING SYSTEM

TECHNICAL FIELD

The present invention relates to a sound source determining system, and in particular to a sound source determining system suitable for use in airports or the like for determining the locations of aircraft or the like.

BACKGROUND OF THE INVENTION

Normally, various taxiways are laid in an airport for permitting aircraft to taxi from one place to another, and it is essential to determine where in these taxiways each aircraft is currently located.

By accurately determining the location of each aircraft in the taxiways, the aircraft on the taxiways can be effectively guided, and collision of the aircraft on the taxiways can be avoided.

As methods for determining the locations of aircraft in an airport or the like, there are known (1) the method of visually determining the locations of aircraft by a number of personnel monitoring the aircraft either directly with their own eyes or by using ITVs; and (2) the method of determining the locations of aircraft according to the outputs of sensors placed along the taxiways.

However, since an airport typically consists of a vast area and each of the taxiways extends a substantial distance, a large number of personnel are required for visually monitoring aircraft either directly with their own eyes or by using ITVs, and the need for human intervention does not allow total elimination of the possibility of accidents due to human errors.

When a number of sensors are to be arranged along taxiways, the number of the sensors must be adequate and they must be wisely arranged in proper locations for them to be effective in accurately determining the positions of aircraft. However, there is a limit to the locations where such sensors can be installed, and the cost will be prohibitively high when a large number of sensors are to be placed in a large number of locations.

BRIEF SUMMARY OF THE INVENTION

In view of such problems, a primary object of the present invention is to provide a sound source determining system which can accurately and economically identify the positions of aircraft or the like in airports or the like.

To achieve such an object, the present invention provides a sound source determining system, comprising: a plurality of acoustic sensors arranged in an array at a prescribed interval for detecting an acoustic signal produced from a sound source; a plurality of delay circuits connected to outputs of the acoustic sensors and having delay times which are different from one to a next by a unit time period; an adder circuit for adding up outputs of the delay circuits; and direction determining means for determining the direction of the sound source according to the unit time period which will maximize an output of the adder circuit.

The present invention also provides a sound source determining system, comprising: a plurality of acoustic sensors arranged in an array at a prescribed interval for detecting an acoustic signal produced from a sound source; a plurality of variable delay circuits connected to outputs of the acoustic sensors and having delay times which are different from one to a next by a unit time period, each of the variable delay circuits being adapted to scan or sweep the unit time period; an adder circuit for adding up outputs of the variable delay circuits; an adaptive filter which removes influences of a specific spectral component selected from a plurality of spectral components produced from the adder circuit in association with the scanning of the unit time period by the variable delay circuits, by adaptively adding the specific spectral component to the other spectral components; and direction determining means for determining the direction of the sound source according to the output of the adaptive filter.

The present invention also provides a sound source determining system, comprising: a plurality of sound source direction determining means arranged in different locations, each including: a plurality of acoustic sensors arranged in an array at a prescribed interval for detecting an acoustic signal produced from a sound-source; a plurality of delay circuits connected to outputs of the acoustic sensors and having delay times which are different from one to a next by a unit time period; an adder circuit for adding up outputs of the delay circuits; and direction determining means for determining the direction of the sound source according to the unit time period which will maximize an output of the adder circuit; and host means for gathering data on the direction determined by the sound source direction determining means, and determining the position of the sound source according to this data.

The present invention also provides a sound source determining system, comprising: a plurality of sound source direction determining means arranged in different locations, each including: a plurality of acoustic sensors arranged in an array at a prescribed interval for detecting an acoustic signal produced from a sound source; a plurality of variable delay circuits connected to outputs of the acoustic sensors and having delay times which are different from one to a next by a unit time period, each of the variable delay circuits being adapted to scan the unit time period; an adder circuit for adding up outputs of the variable delay circuits; an adaptive filter which removes influences of a specific spectral component selected from a plurality of spectral components produced from the adder circuit in association with the scanning of the unit time period by the variable delay circuits, by adaptively adding the specific spectral component to the other spectral components; and direction determining means for determining the direction of the sound source according to the output of the adaptive filter; and host means for gathering data on the directions determined by the sound source direction determining means, and determining the position of the sound source according to this data.

According to the present invention, the direction of a sound source is determined by arranging a plurality of acoustic sensors in an array at a prescribed interval for detecting an acoustic signal produced from the sound source, connecting outputs of the acoustic sensors to plurality of delay circuits having delay times which are different from one to a next by a unit time period, adding outputs of the delay circuits in an adder circuit, and determining the direction of the sound source according to the unit time period which will maximize an output of the adder circuit by using the direction determining means.

Here, the delay circuits may comprise a delay circuit which is connected to a central one of the acoustic sensors; a first group of delay circuits each connected to one of the acoustic sensors located on one side of the central acoustic sensor and having delay time periods which are different, beginning from the central delay circuit, from one to a next by a unit time period in a negative direction; and a second group of delay circuits each connected to one of the acoustic sensors located on the other side of the central acoustic sensor and having delay time periods which are different, beginning from the central delay circuit, from one to a next by a unit time period in a positive direction.

The direction determining means may comprise an adaptive filter which removes influences of a specific output signal selected from output signals of the adder circuit, each produced from the adder circuit in association with elapsing of each unit time period, on other signals produced from the adder circuit, by adaptively adding the specific output signal to the other signals.

The adaptive filter may remove the influences of the specific output signal on the other signals by adding a product of a negative coefficient and the specific output signal to the other signals.

The direction determining means may comprise an adaptive filter which removes influences of specific output signals selected from output signals of the adder circuit, each produced from the adder circuit in association with elapsing of each unit time period, on other signals produced from the adder circuit, by adaptively adding the specific output signals to the other signals.

According to the present invention, a plurality of acoustic sensors are arranged in an array at a prescribed interval for detecting an acoustic signal produced from a sound source, and a plurality of variable delay circuits are connected to outputs of the acoustic sensors, the variable delay circuits having delay times which are different from one to a next by a unit time period, each of the variable delay circuits being adapted to scan the unit time period. An adder circuit is provided for adding up outputs of the variable delay circuits, and an adaptive filter removes influences of a specific spectral component selected from a plurality of spectral components produced from the adder circuit in association with the scanning of the unit time period by the variable delay circuits, by adaptively adding the specific spectral component to the other spectral components. Direction determining means finally identifies the direction of the sound source according to the output of the adaptive filter.

The adaptive filter may comprise spectral separation unit for separating a plurality of spectral components from the output signal of the adder circuit according to the scanning by the variable delay circuits; and an adaptive filter unit for removing influences of a specific spectral component selected from a plurality of spectral components produced from the adder circuit in association with the scanning of the unit time period by the variable delay circuits, by adaptively adding the specific spectral component to the other spectral components.

The adaptive filter may remove the influences of the specific spectral component on the other spectral components by adding a product of a negative coefficient and the specific spectral component to the other spectral components.

Also, the adaptive filter unit may remove influences of a plurality of specific spectral components selected from a plurality of spectral components produced from the adder circuit in association with the scanning of the unit time period by the variable delay circuits, by adaptively adding the specific spectral components to the other spectral components.

The direction determining means may identify the direction of the sound source according to a maximum peak of the spectral components produced from the adaptive filter.

The direction determining means may likewise identify the directions of a plurality of sound sources according a plurality of peaks of the spectral components produced from the adaptive filter.

According to the present invention, a plurality of sound source direction determining means are arranged in different locations, each including: a plurality of acoustic sensors arranged in an array at a prescribed interval for detecting an acoustic signal produced from a sound source; a plurality of delay circuits connected to outputs of the acoustic sensors and having delay times which are different from one to a next by a unit time period; an adder circuit for adding up outputs of the delay circuits; and direction determining means for determining the direction of the sound source according to the unit time period which will maximize an output of the adder circuit; and host means gathers data on the direction determined by the sound source direction determining means, and identifies the position of the sound source according to this data.

According to the present invention, a plurality of sound source direction determining means arranged in different locations, each including: a plurality of acoustic sensors arranged in an array at a prescribed interval for detecting an acoustic signal produced from a sound source; a plurality of variable delay circuits connected to outputs of the acoustic sensors and having delay times which are different from one to a next by a unit time period, each of the variable delay circuits being adapted to scan the unit time period; an adder circuit for adding up the outputs of the variable delay circuits; an adaptive filter which removes influences of a specific spectral component selected from a plurality of spectral components produced from the adder circuit in association with the scanning of the unit time period by the variable delay circuits, by adaptively adding the specific spectral component to the other spectral components; and direction determining means for determining the direction of the sound source according to the output of the adaptive filter; and host means gathers data on the direction determined by the sound source direction determining means, and identifies the position of the sound source according to this data.

Each of the sound source direction determining means may identify directions of a plurality of sound sources; and the host means may gather data on the directions determined by the sound source direction determining means, and identify the positions of the sound sources according to this data.

Each of the sound source direction determining means may identify the direction of a reference sound source placed at a prescribed location and the direction of the sound source to be determined; and the host means may gather data on the direction of the sound source to be determined by the sound source direction determining means, correct the direction of the sound source to be determined according to the determined direction of the reference sound source and identify the position of the sound source according to the corrected direction.

BRIEF DESCRIPTION OF THE DRAWINGS

Now the present invention is described in the following with reference to the appended drawings, in which.

DETAILED DESCRIPTION OF THE PREFERRED EMBODIMENTS

First of all, the principle of determining the direction of a sound source with the sound source determining system according to the present invention is described in the following with reference to FIGS. 1 through 3.

Figure 1:
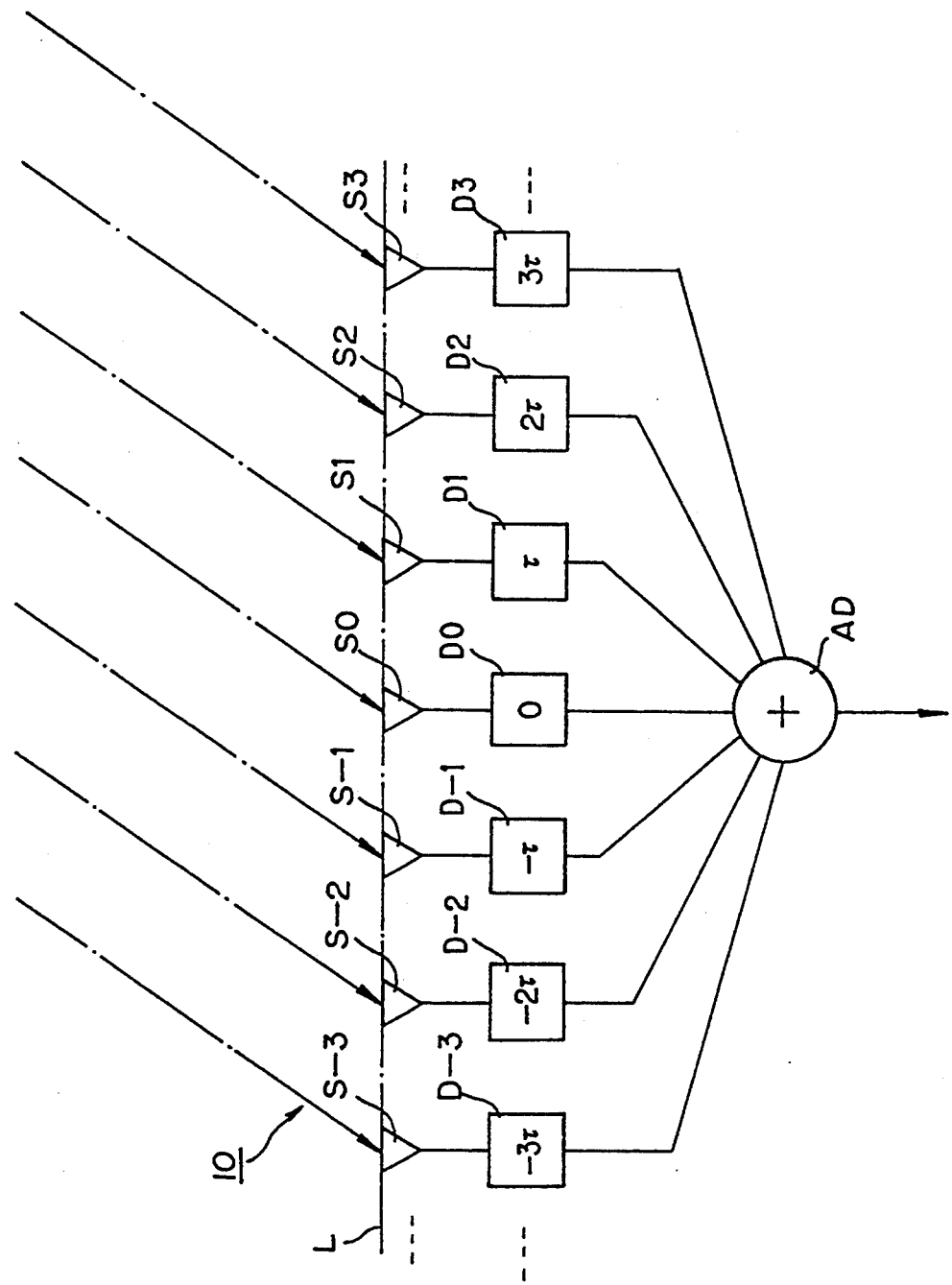
FIG. 1 is a circuit diagram showing the essential structure of the sound source direction finding unit for determining the direction of the sound source in the sound source determining system of the present invention.

FIG. 1 shows the structure of a sound source direction finding unit for determining the direction of a sound source in the sound source determining system of the present invention. Referring to FIG. 1, the sound source direction finding unit 10 comprises acoustic sensors S0, S1, S2, S3, . . . , and S-1, S-2, S-3, . . . , delay circuits D0, D1, D2, D3, . . . , and D-1, D-2, D-3, . . . , connected to the outputs of the acoustic sensors S0, S1, S2, S3, . . . , and S-1, S-2, S-3, . . . , and an adder circuit AD for adding up the outputs of the delay circuits D0, D1, D2, D3, . . . , and D-1, D-2, D-3, . . . .

These acoustic sensors S0, S1, S2, S3, . . . , and S-1, S-2, S-3, . . . receive an acoustic signal produced from a sound source not shown in the drawing, and produce corresponding electric output signals.

These delay circuits D0, D1, D2, D3, . . . , and D-1, D-2, D-3, . . . are assigned with different delay times "0", "$\tau$", "$2\tau$", "$3\tau$", . . . , "$-\tau$", "$-2\tau$", "$-3\tau$", . . . , respectively, and supply electric signals which correspond to the acoustic signals detected by the acoustic sensors S0, S1, S2, S3, . . . , and S-1, S-2, S-3, . . . but delayed by the delay times of "0", "$\tau$", "$2\tau$", "$3\tau$", . . . , "$-\tau$", "$-2\tau$", "$-3\tau$", . . . , respectively.

The adder circuit AD adds up the output signals from the delay circuits D0, D1, D2, D3, . . . , and D-1, D-2, D-3, . . . , and produces an added-up signal.

If the sound source not shown in the drawing is sufficiently remote from the sound source direction finding unit 10, the acoustic sensors S0, S1, S2, S3, . . . , and S-1, S-2, S-3, . . . will receive the acoustic signal from this sound source at a same angle.

Figure 2:
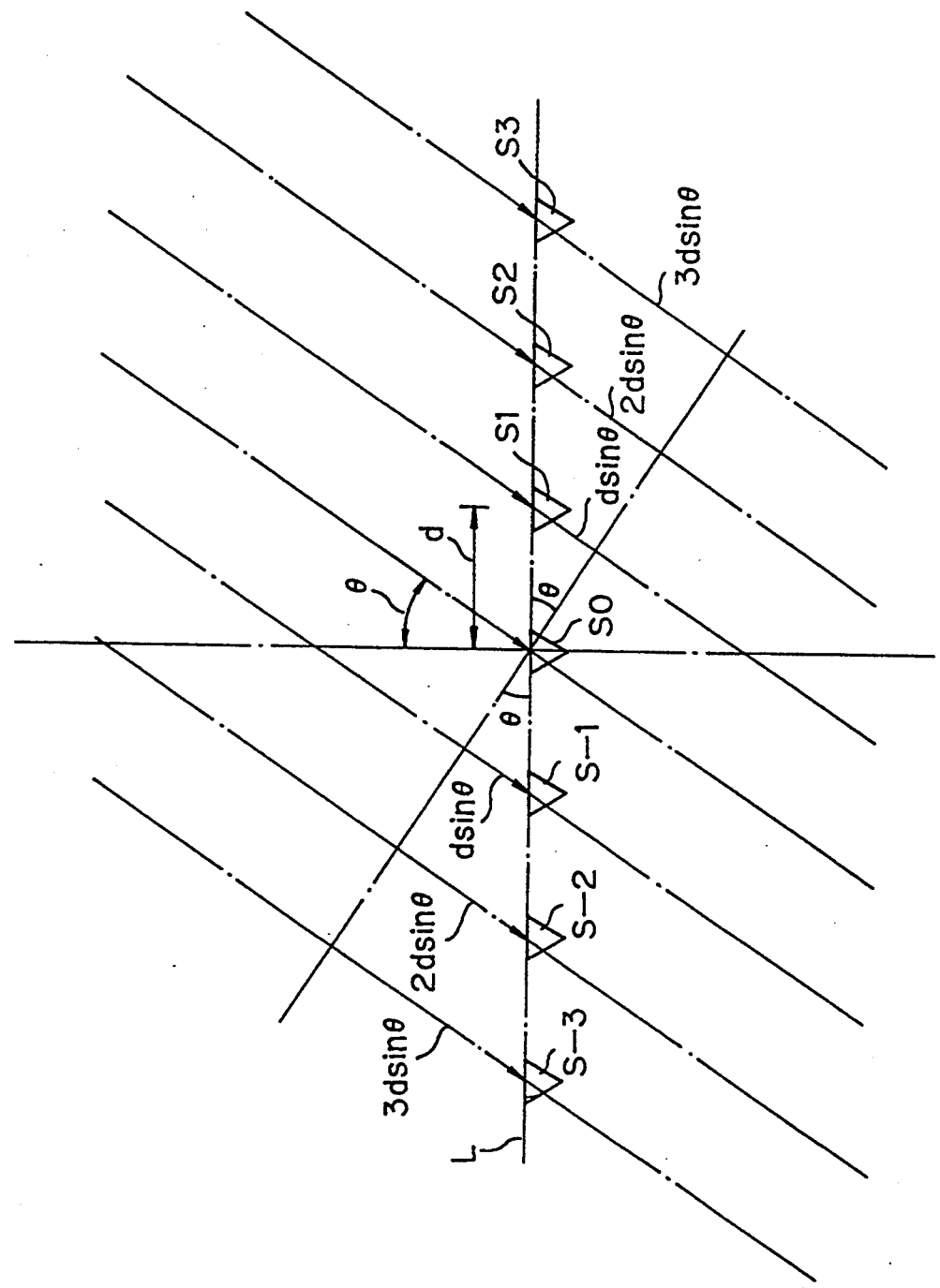
FIG. 2 is a diagram showing the principle of determining the direction of a sound source in the sound source determining system of the present invention.

For instance, if the acoustic sensor is located at an angle $\theta$ with respect to a direction perpendicular to the line L along which the acoustic sensors S0, S1, S2, S3, . . . , and S-1, S-2, S-3, . . . are arranged, the acoustic sensors S0, S1, S2, S3, . . . , and S-1, S-2, S-3, . . . will then receive the acoustic signal from the sound source at the angle $\theta$ as shown in FIG. 2.

If the interval between the acoustic sensors S0, S1, S2, S3, . . . , and S-1, S-2, S-3, . . . is d, the acoustic sensors S1, S2, S3, . . . will receive acoustic signals from the sound source which are ahead the signal received by the acoustic sensor S0 by the distances of d·sin$\theta$, 2d·sin$\theta$, 3d·sin$\theta$, respectively, and the acoustic sensors S-1, S-2, S-3, . . . will receive acoustic signals from the sound source which are behind the signal received by the acoustic sensor S0 by the distances of d·sin$\theta$, 2d·sin$\theta$, 3d·sin$\theta$, respectively.

If the travelling speed of the acoustic signal from the sound source is V, then, the acoustic sensors S1, S2, S3, . . . will receive acoustic signals from the sound source which are ahead the signal received by the acoustic sensor S0 by the time intervals of d·sin$\theta$/V, 2d·sin$\theta$/V, 3d·sin$\theta$/V, respectively, and the acoustic sensors S-1, S-2, S-3, . . . will receive acoustic signals from the sound source which are behind the signal received by the acoustic sensor S0 by the time intervals of d·sin$\theta$/V, 2d·sin$\theta$/V, 3d·sin$\theta$/V, respectively.

Figure 3:
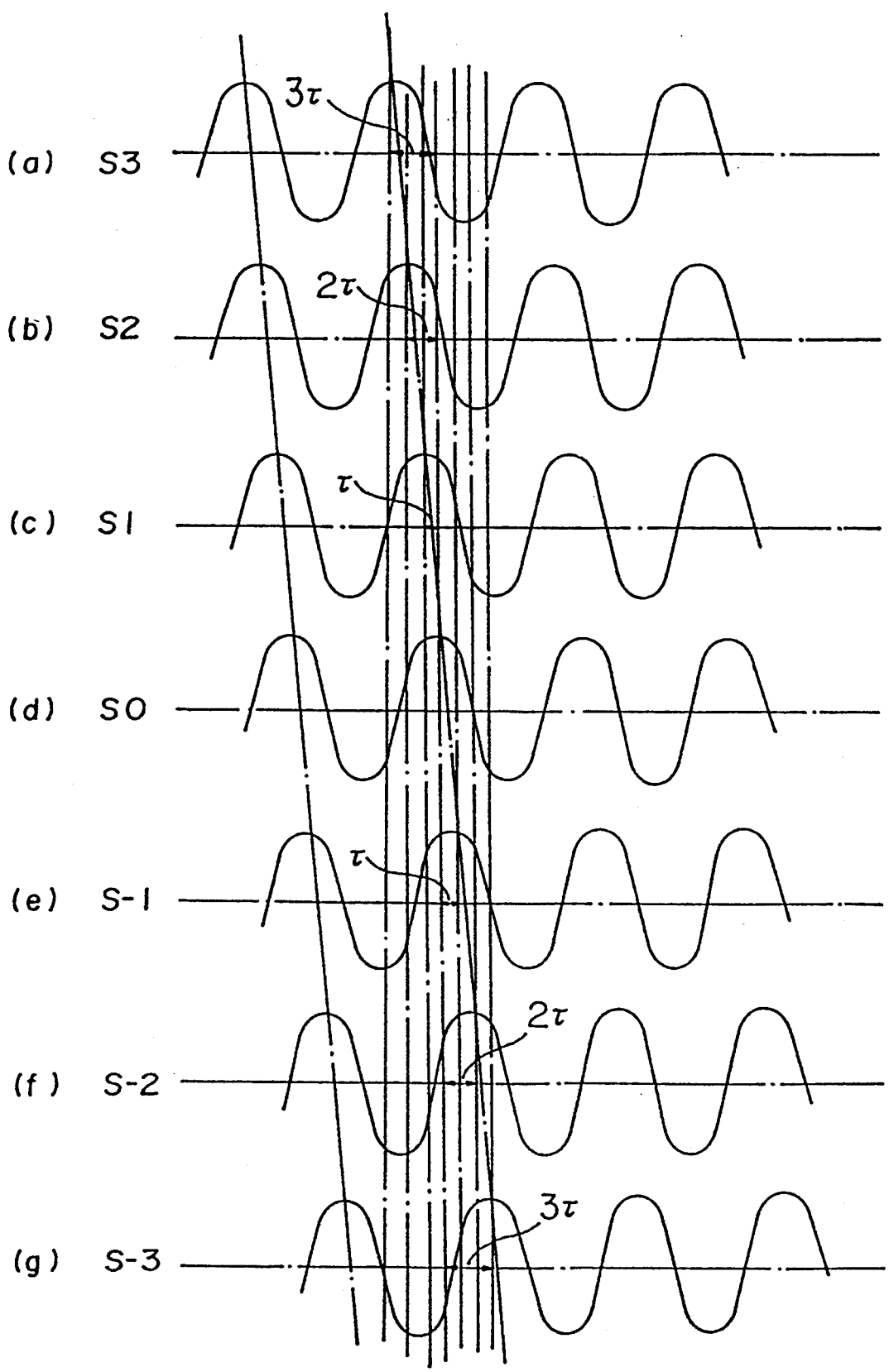
FIG. 3 is a waveform diagram showing an example of outputs of the acoustic sensors shown in FIG. 1.

More specifically, as shown in FIG. 3, the acoustic signals s3 through s1 (refer to FIGS. 3(a) through (c)) received by the acoustic sensors S3 through S1 are ahead the reference acoustic signal s0 (refer to FIG. 3(d)) received by the acoustic sensor S0 by time intervals $3\tau$ (=3d·sin$\theta$/V), $2\tau$ (=2d·sin$\theta$/V), and $\tau$ (=3d·sin$\theta$/V), respectively, and the acoustic signals s-3 through s-1 (refer to FIGS. 3(e) through (g)) received by the acoustic sensors S3 through S1 are behind the reference acoustic signal s0 (refer to FIG. 3(d)) received by the acoustic sensor S0 by time intervals $3\tau$ (=3d·sin$\theta$/V), $2\tau$ (=2d·sin$\theta$/V), and $\tau$ (=3d·sin$\theta$/V), respectively.

If the delay circuits D0, D1, D2, D3, . . . , and D-1, D-2, D-3, . . . shown in FIG. 1 are constructed such that the value of $\tau$ is given as follows:

$$\tau = d \cdot \sin\theta / V \quad (1)$$

or the delay times of the delay circuits D1, D2, D3, with respect to that of the reference delay circuit D0 are $3\tau$ ($=3d\cdot\sin\theta/V$), $2\tau$ ($=2d\cdot\sin\theta/V$), and $\tau$ ($=3d\cdot\sin\theta/V$), respectively, and the delay times of the delay circuits D-1, D-2, D-3, ... with respect to that of the reference delay circuit D0 are $-3\tau$ ($=-3d\cdot\sin\theta/V$), $-2\tau$ ($=-2d\cdot\sin\theta/V$), and $-\tau$ ($=-3d\cdot\sin\theta/V$), respectively, then, the adder circuit AD will add up these acoustic signals in an identical phase as illustrated in FIG. 3, and will produce a signal as a combination of mutually reinforcing acoustic signals with respect to an acoustic signal from the sound source located at the angle $\theta$.

On the other hand, acoustic signals not coming from the angle $\theta$ will not produce mutually reinforcing signals from the acoustic sensors.

Therefore, by finding the value $\tau$ which maximizes the output level of the adder circuit AD, the direction of the sound source in relation with the sound source direction finding unit 10 can be given by the following equation.

$$\tau=\sin^{-1}(\tau V/d) \qquad (2)$$

Figure 4:
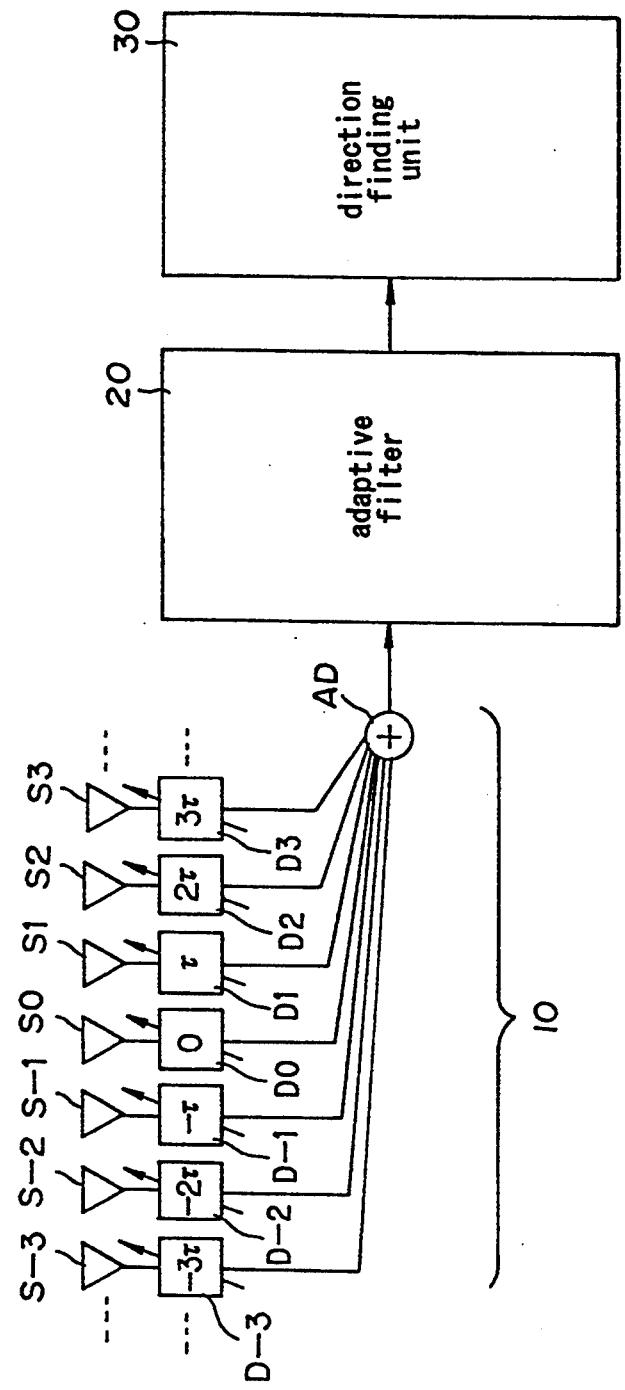
FIG. 4 is a block diagram showing an embodiment of the sound source direction determining system according to the present invention.
Figure 5:
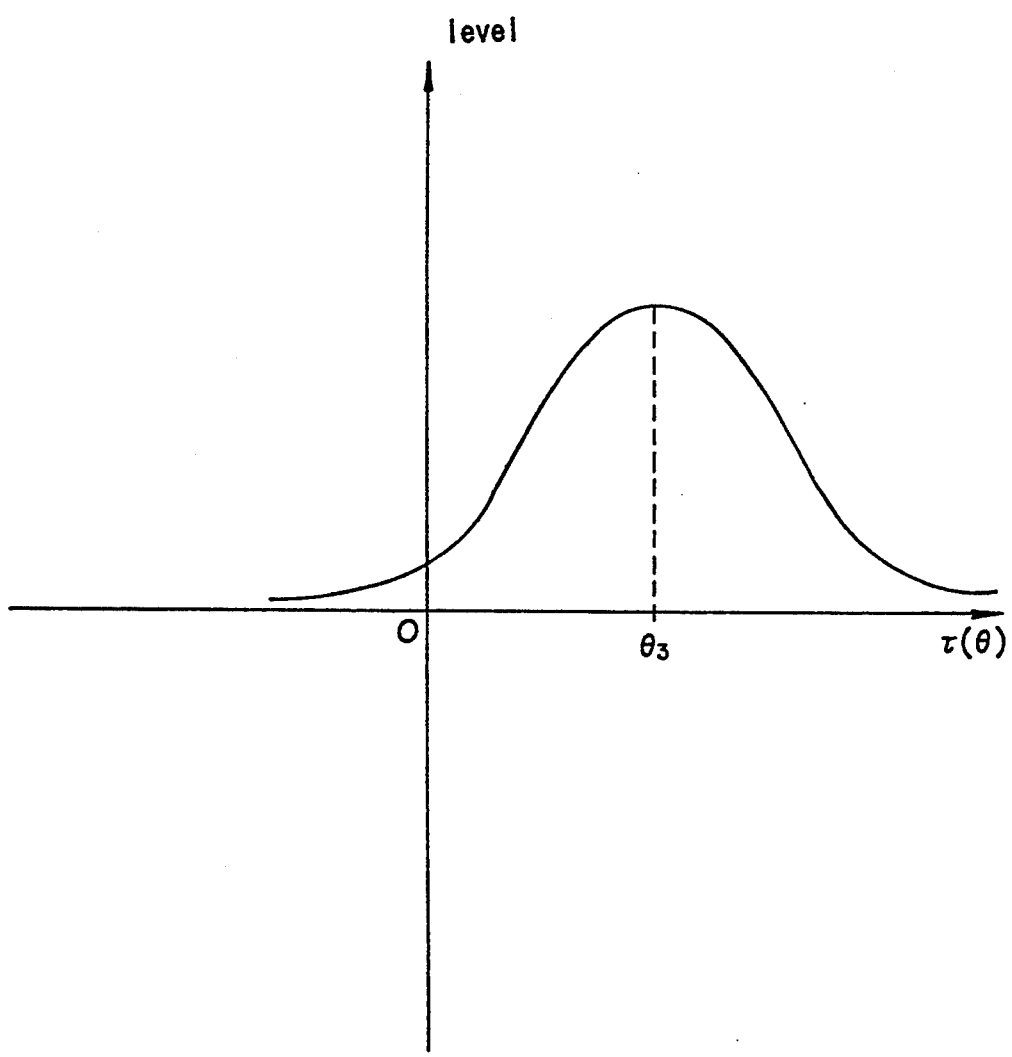
FIG. 5 is a waveform diagram showing an example of spectral waveforms produced from the adder circuit shown in FIG. 4 when there is only one sound source.

FIG. 4 shows an embodiment of the sound source determining system according to the present invention as constructed as a sound source direction determining system.

Referring to FIG. 4, this sound source direction determining system consists of a sound source direction finding unit 10, an adaptive filter 20, and a direction finding unit 30.

The sound source direction finding unit 10 is basically identical to the one shown in FIG. 1. More specifically, the sound source direction finding unit comprises acoustic sensors S0, S1, S2, S3, ..., and S-1, S-2, S-3, ..., delay circuits D0, D1, D2, D3, ..., and D-1, D-2, D-3, ..., connected to the outputs of the acoustic sensors S0, S1, S2, S3, ..., and S-1, S-2, S-3, ..., and an adder circuit AD for adding up the outputs of the delay circuits D0, D1, D2, D3, ..., and D-1, D-2, D-3, .... In particular, in the sound source direction finding unit 10 illustrated in FIG. 4, the delay circuits D0, D1, D2, D3, ..., and D-1, D-2, D-3, ... are constructed so that each of them can scan or sweep the value of $\tau$. Thus, the adder circuit AD can produce spectral components in association with the scanning or sweeping of the value $\tau$. Here, the spectral components are meant as those outputs of the adder circuit AD generated in association with the scanning of the value $\tau$ that are greater than a prescribed value.

The value of $\tau$ which corresponds to the maximum value of spectral components indicates the direction of the sound source.

The adaptive filter 20 adaptively removes the interferences between the spectral components produced from the adder circuit AD of the sound source direction finding unit 10.

More specifically, in FIGS. 1 through 3, it was assumed that the sound source is sufficiently remote from the sound source direction finding unit 10, and the acoustic sensors S0, S1, S2, S3, ..., and S-1, S-2, S-3, ... receive the acoustic signal produced from the sound source from a same direction, but, in reality, the acoustic sensors S0, S1, S2, S3, ..., and S-1, S-2, S-3, ... do not receive the acoustic signal produced from the identical sound source at a same angle. Instead, the angle of the acoustic signal has a certain spread depending on the distance between the sound source and the sound source direction finding unit 10. Because of this spread, substantial interferences are produced between spectral components produced from the adder circuit AD, and the spectral width is substantial.

Thus, according to this embodiment, by using the adaptive filter 20, the spectral width is reduced, and the accuracy in the identification of the direction of the sound source is increased.

The operation of this adaptive filter is now described in the following with reference to FIGS. 5 through 10.

Suppose that the sound source is located at the angle of $\theta 3$ with respect to the sound source direction finding unit 10. Then, the adder circuit AD produces a wide spectrum around $\theta 3$ in relation with the scanning or sweeping of the value of "$\tau$".

If the direction of the sound source is determined according to this spectrum, its accuracy is substantially limited due to the spectral spread. Therefore, according to this embodiment, the signals are processed in the adaptive filter 20 as shown in FIG. 6, and the spectrum is converted into one having a sharp peak as shown in FIG. 7.

Figure 6:
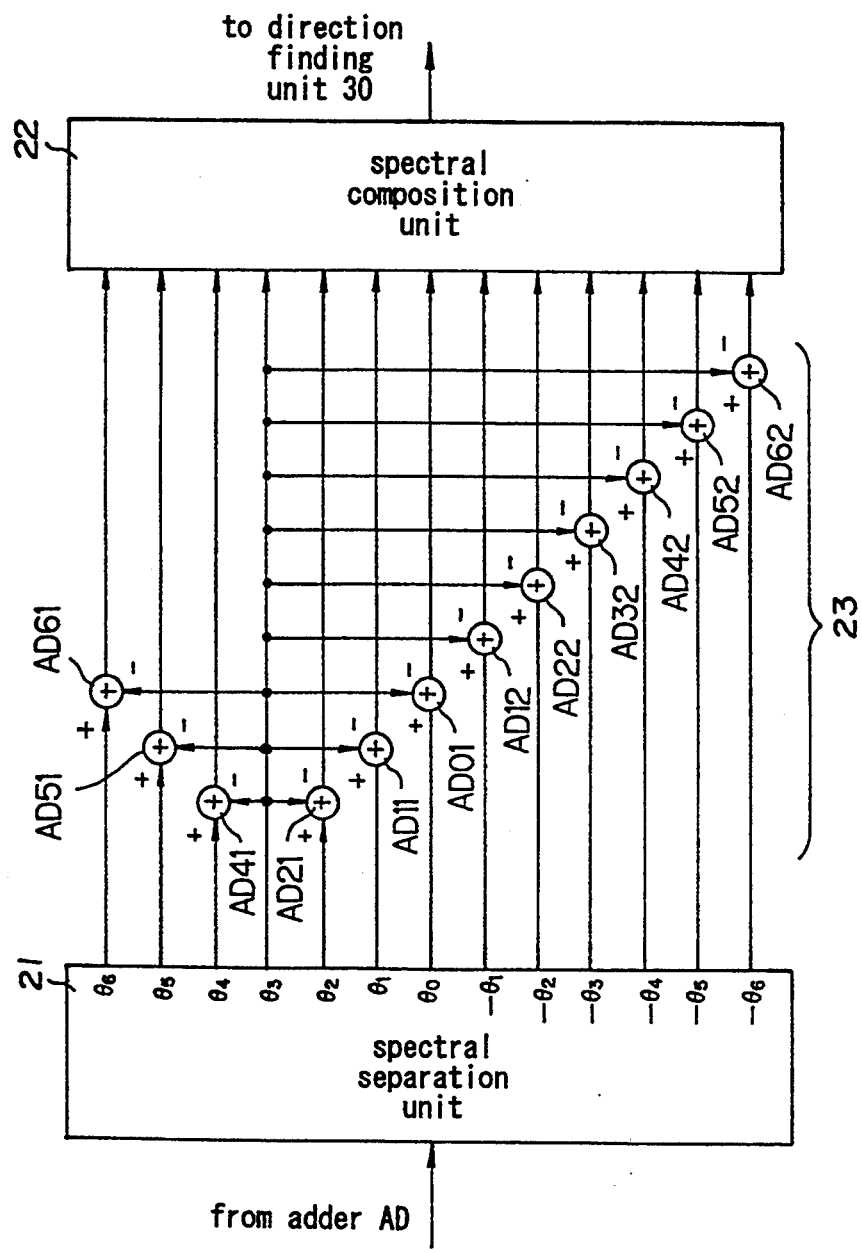
FIG. 6 is a circuit diagram for showing the operation of the adaptive filter shown in FIG. 4 in relation with the spectral waveforms shown in FIG. 5.
Figure 7:
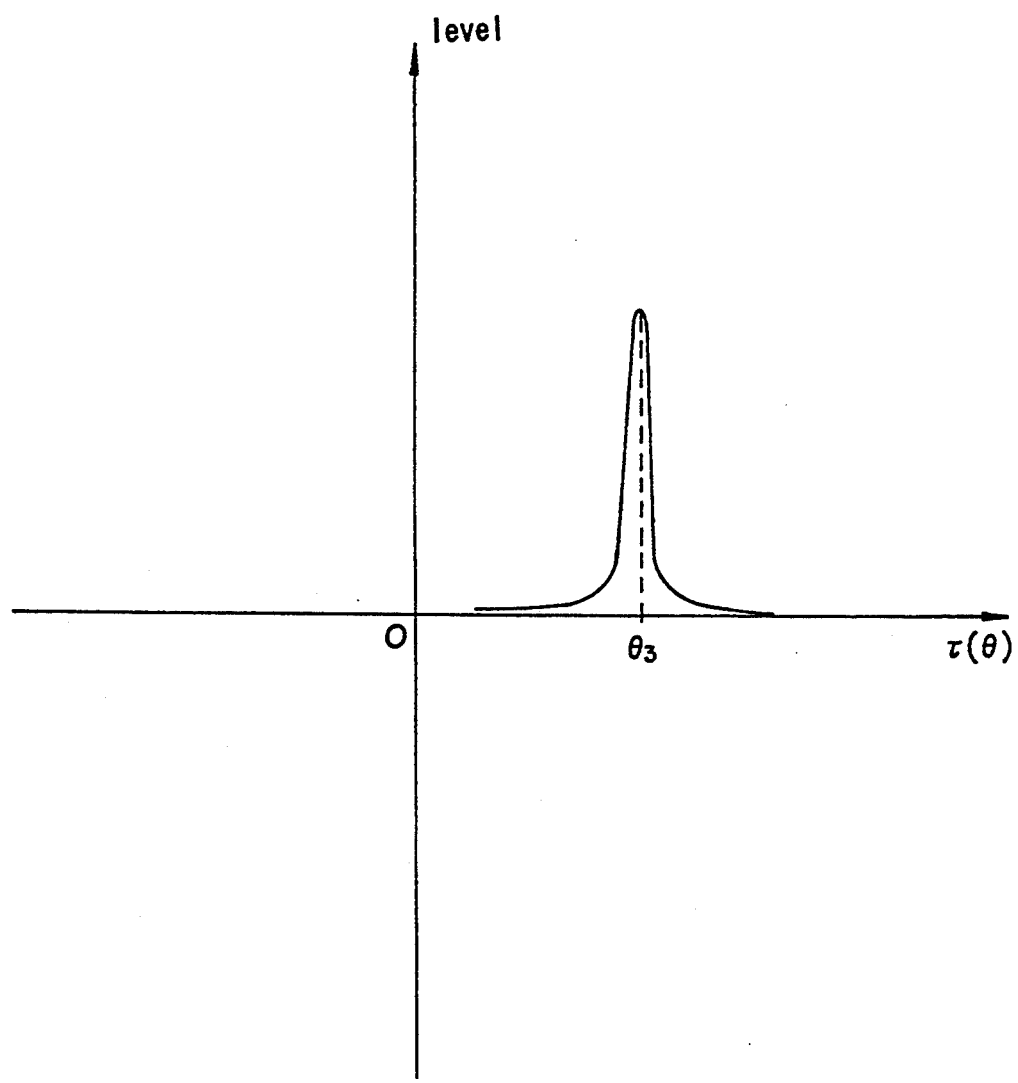
FIG. 7 is a waveform diagram showing an example of spectral waveforms which are processed by the adaptive filter shown in FIG. 4 with regard to the spectral waveforms shown in FIG. 5.

In this case, the adaptive filter 20 performs its function through its components consisting of a spectral separation unit 21, an adaptive filter unit 23, and a spectral composition unit 22, as shown in FIG. 6. First of all, in the spectral separation unit 21, the signal produced from the adder circuit AD is separated into spectral components $\theta 6$ through $\theta 1$, $\theta 0$, and $-\theta 1$ through $-\theta 6$. These spectral components $\theta 6$ through $\theta 1$, $\theta 0$, and $-\theta 1$ through $-\theta 6$ are supplied to the adaptive filter unit 23 consisting of adder circuits AD61 through AD11, AD01, and AD12 through AD62.

In the adaptive filter unit 23, by adaptively adding the spectral component $\theta 3$ to other spectral components by using the adder circuits AD61 through AD11, AD01, AD12 through AD62, the influences or the interferences of the spectral component $\theta 3$ on other spectral components are adaptively removed.

First of all, in the adder circuits AD41 and AD21, the spectral component $\theta 3$ is subtracted from the spectral component $\theta 4$, and from the spectral component $\theta 2$, respectively. In the adder circuits AD51 and AD11, the spectral component $\theta 3$ is subtracted from the spectral component $\theta 5$, and from the spectral component $\theta 1$, respectively. In the adder circuits AD61 and AD01, the spectral component $\theta 3$ is subtracted from the spectral component $\theta 6$, and from the spectral component $\theta 0$, respectively. Then, the spectral component $\theta 3$ is subtracted from the spectral component $\theta -1$ in the adder circuit AD12, from the spectral component $\theta -2$ in the adder circuit AD22, from the spectral component $\theta -3$ in the adder circuit AD32, from the spectral component $\theta -4$ in the adder circuit AD42, from the spectral component $\theta -5$ in the adder circuit AD52, and from the spectral component $\theta -6$ in the adder circuit AD62.

It is also possible to multiply $\theta 3$ by a certain different factor before each subtraction.

Thus, the signal subjected to the adaptive filtering process at the adaptive filter 23 is fed to the spectral composition unit 22, and after being suitably processed thereby, supplied to the direction finding unit 30 shown in FIG. 4.

The direction finding unit 30 determines the direction of the sound source as a direction giving the maximum level of this signal. The signal supplied to the direction finding unit 30 has a narrow and sharp spectral width as shown in FIG. 7 as a result of the adaptive filtering process carried out in the adaptive filter unit 23, and allows the direction of the sound source to be determined very accurately.

Figure 8:
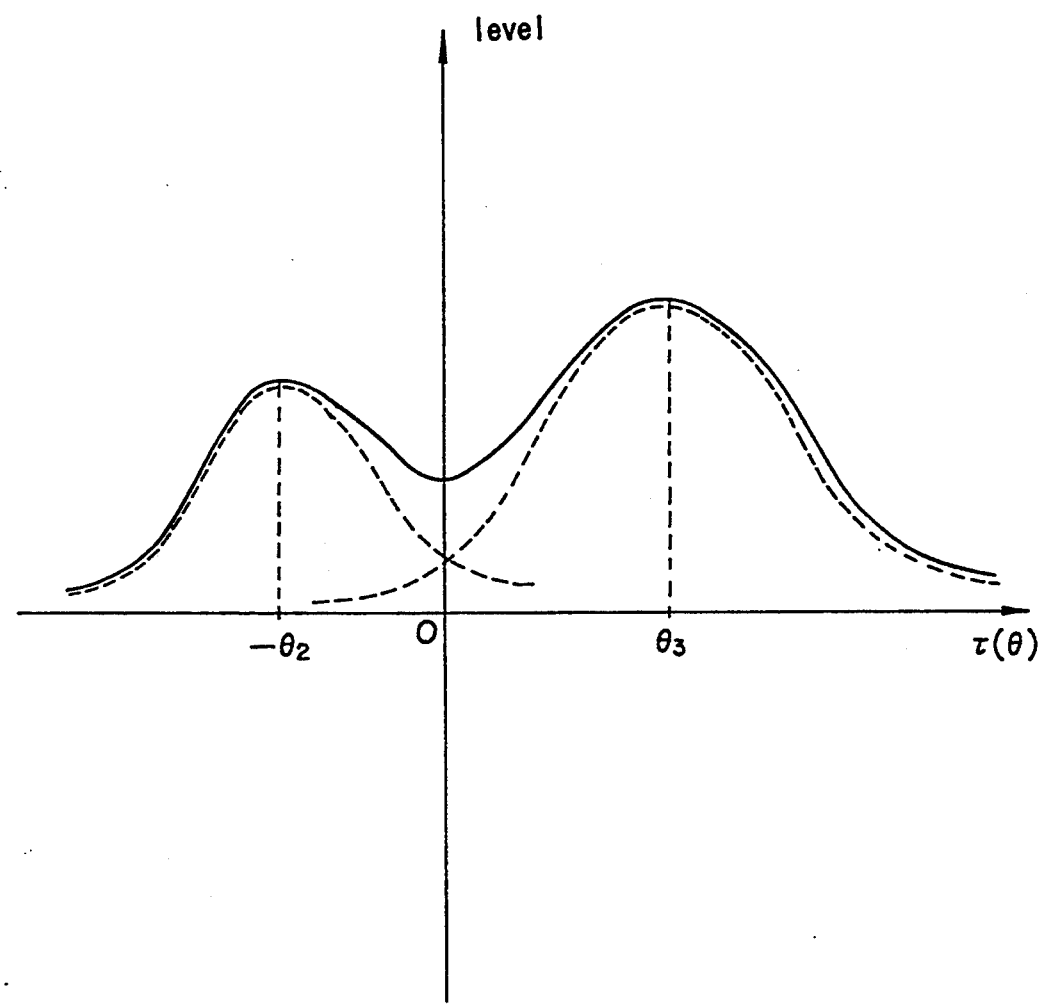
FIG. 8 is a waveform diagram showing an example of spectral waveforms produced from the adder circuit shown in FIG. 4 when there are two sound sources.

FIG. 8 shows the output of the adder circuit AD when there are two sound sources at the angles of $\theta 3$, and $-\theta 2$, and in this case there is a substantial spectral width due to the interferences in the two signals from the two sound sources. Therefore, in this case, the signals are subjected to a process illustrated in FIG. 9 in the adaptive filter unit 20, and converted into two narrow and sharp spectra as shown in FIG. 10.

Figure 9:
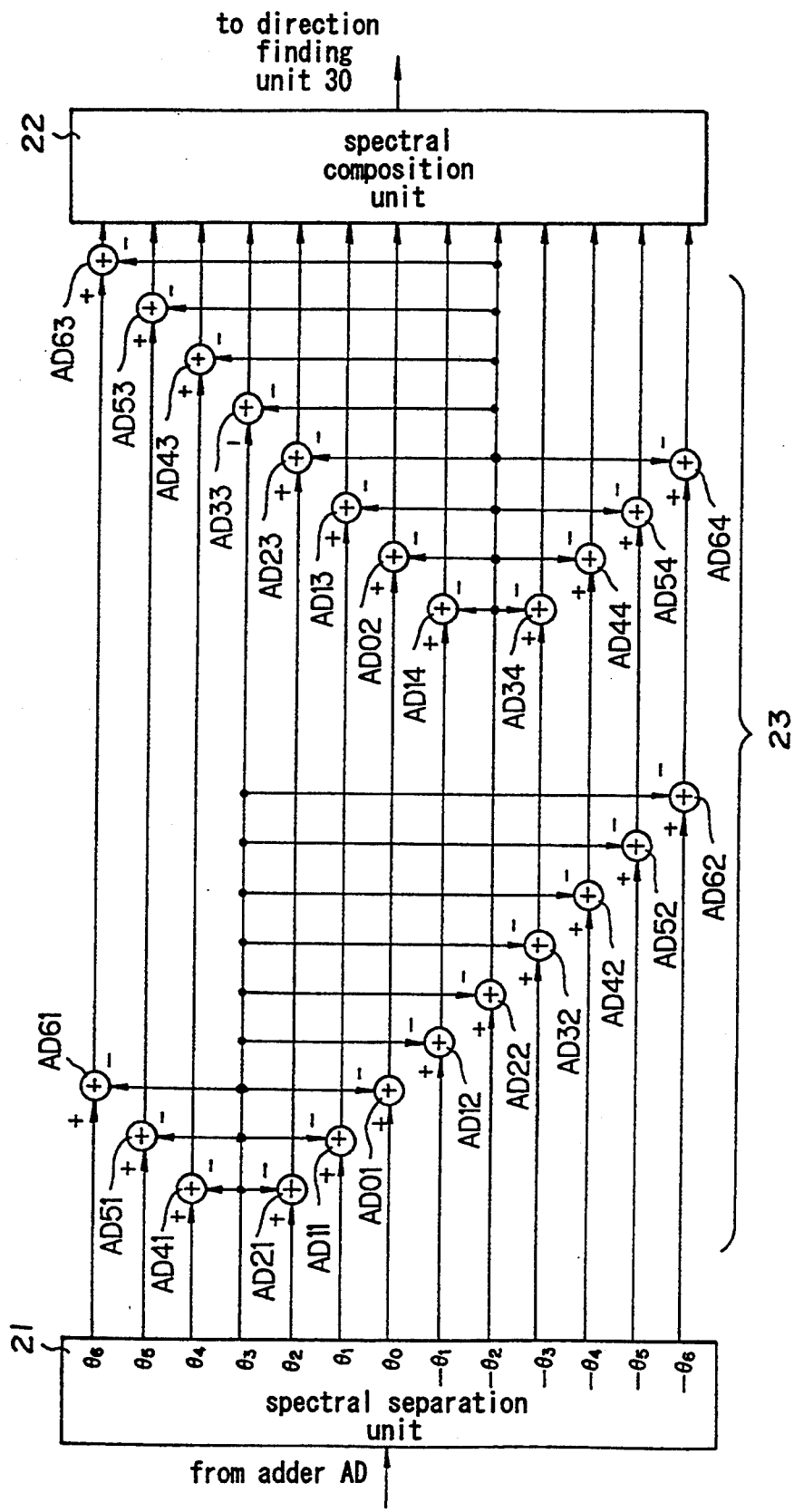
FIG. 9 is a circuit diagram for showing the operation of the adaptive filter shown in FIG. 4 in relation with the spectral waveforms shown in FIG. 8.
Figure 10:
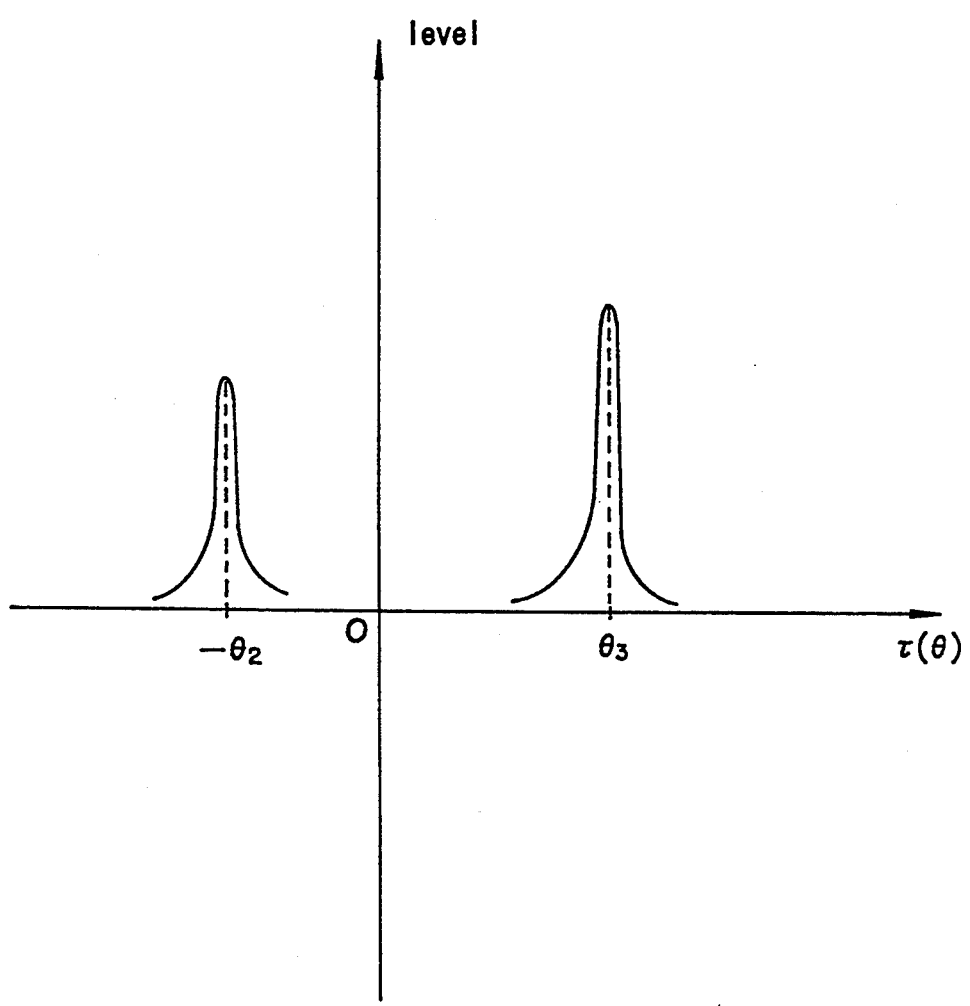
FIG. 10 is a waveform diagram showing an example of spectral waveforms which are processed by the adaptive filter shown in FIG. 4 with regard to the spectral waveforms shown in FIG. 8.

More specifically, the adaptive filter 20 performs its function through its components consisting of an spectral separation unit 21, an adaptive filter unit 23, and a spectral composition unit 22, as shown in FIG. 9. First of all, in the spectral separation unit 21, the signal produced from the adder circuit AD is separated into spectral components $\theta 6$ through $\theta 1$, $\theta 0$, and $-\theta 1$ through $-\theta 6$. These spectral components $\theta 6$ through $\theta 1$, $\theta 0$, and $\theta -1$ through $-\theta 6$ are supplied to the adaptive filter unit 23 consisting of adder circuits AD61 through AD11, AD01, AD12 through AD62, adder circuits AD63 through AD13, AD02, and AD14 through AD64.

In the adaptive filter unit 23, by adaptively adding the spectral component $\theta 3$ to other spectral components by using the adder circuits AD61 through AD11, AD01, AD12 through AD62, the influences or the interferences of the spectral component $\theta 3$ on other spectral components are adaptively removed. Then, by adaptively adding the spectral component $-\theta 2$ to other spectral components by using the adder circuits AD63 through AD13, AD02, AD14 through AD64, the influences or the interferences of the spectral component $-\theta 2$ on other spectral components are adaptively removed.

First of all, in the adder circuits AD41 and AD21, the spectral component $\theta 3$ is subtracted from the spectral component $\theta 4$, and from the spectral component $\theta 2$, respectively. In the adder circuits AD51 and AD11, the spectral component $\theta 3$ is subtracted from the spectral component $\theta 5$, and from the spectral component $\theta 1$, respectively. In the adder circuits AD61 and AD01, the spectral component $\theta 3$ is subtracted from the spectral component $\theta 6$, and from the spectral component $\theta 0$, respectively. Then, the spectral component $\theta 3$ is subtracted from the spectral component $-\theta 1$ in the adder circuits AD12, from the spectral component $-\theta 2$ in the adder circuits AD22, from the spectral component $-\theta 3$ in the adder circuits AD32, from the spectral component $-\theta 4$ in the adder circuits AD42, from the spectral component $-\theta 5$ in the adder circuits AD52, and from the spectral component $-\theta 6$ in the adder circuits AD62.

It is also possible to multiply $\theta 3$ by a certain different factor before each subtraction.

Thus, the influences or the interferences of the spectral component $\theta 3$ on other spectral components are adaptively removed.

Then, in the adder circuits AD14 and AD34, the output of the adder circuit AD22 is subtracted from the output of the adder circuit AD12, and from the output of the adder circuit AD32, respectively. In the adder circuits AD02 and AD44, the output of the adder circuit AD22 is subtracted from the output of the adder circuit AD01, and from the adder circuit AD42, respectively. In the adder circuits AD13 and AD54, the output of the adder circuit AD22 is subtracted from the output of the adder circuit AD11, and from the output of the adder circuit AD52, respectively. In the adder circuits AD23 and AD64, the output of the adder circuit AD22 is subtracted from the output of the adder circuit AD31, and from the output of the adder circuit AD62, respectively. Then, the output of the adder circuit AD22 is subtracted from the spectral component $\theta 3$ in the adder circuit AD33, from the output of the adder circuit AD41 in the adder circuit AD43, from the output of the adder circuit AD51 in the adder circuit AD53, and from the output of the adder circuit AD61 in the adder circuit AD63.

It is also possible to multiply the output of the adder circuit AD22 by a certain different factor before each subtraction.

Thus, the influences or the interferences of the spectral component $-\theta 2$ on other spectral components can be adaptively removed.

Thus, the signal corresponding to the spectral components which were subjected to the adaptive filtering process at the adaptive filter 23 designed for signals coming from two different directions is fed to the spectral composition unit 22, and after being suitably processed, supplied to the direction finding unit 30 shown in FIG. 4.

The direction finding unit 30 determines the direction of each of the sound sources as a direction giving a peak level of this signal. The signal supplied to the direction finding unit 30 has narrow and sharp spectral widths as shown in FIG. 10 as a result of the adaptive filtering process carried out in the adaptive filter unit 23, and allows the directions of the sound sources to be determined very accurately.

FIG. 9 showed the adaptive filtering process for signals coming from two different directions, but a similar filtering is possible even when there are three or more sound sources coming from three or more directions.

Figure 11:
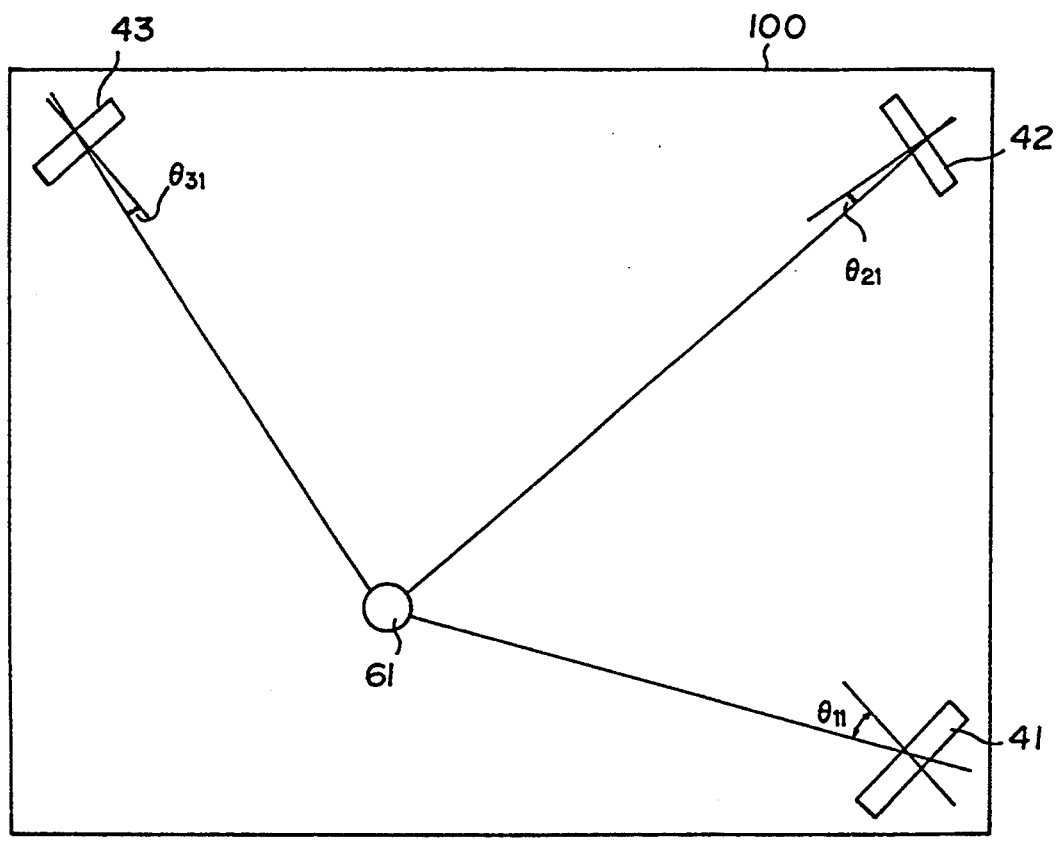
FIG. 11 is a schematic diagram showing another embodiment of the present system as applied as a system for determining the position of aircraft in an airport.

FIG. 11 shows another embodiment of the present invention in which the sound source determining system of the present invention is applied to a system for locating the positions of aircraft in an airport. In this embodiment, aircraft moving in the airport are the sound sources that are to be located.

Referring to FIG. 11, sound source direction determining systems 41, 42 and 43 are arranged in three different locations within a designated area 100 in which the aircraft move about. These sound source direction determining systems 41, 42 and 43 are each constructed substantially identically to the one illustrated in FIG. 4, and can identify the directions of the sound sources with respect to these sound source direction determining systems 41, 42 and 43. In the case shown in FIG. 11, there is only one aircraft 61 within the designated area 100, and the sound source direction determining systems 41, 42 and 43 identify the directions $\theta 11$, $\theta 21$ and $\theta 31$ of the aircraft 61 with respect to the sound source direction determining systems 41, 42 and 43. Here, because the positions of the sound source direction determining systems 41, 42 and 43 are known, it is possible to locate the position of the aircraft 61 within the designated area 100 of the aircraft 61 from these directions $\theta 11$, $\theta 21$ and $\theta 31$.

The sound source direction determining systems 41, 42 and 43 shown in FIG. 11 may be provided at some height or underground in the designated area 100.

Figure 12:
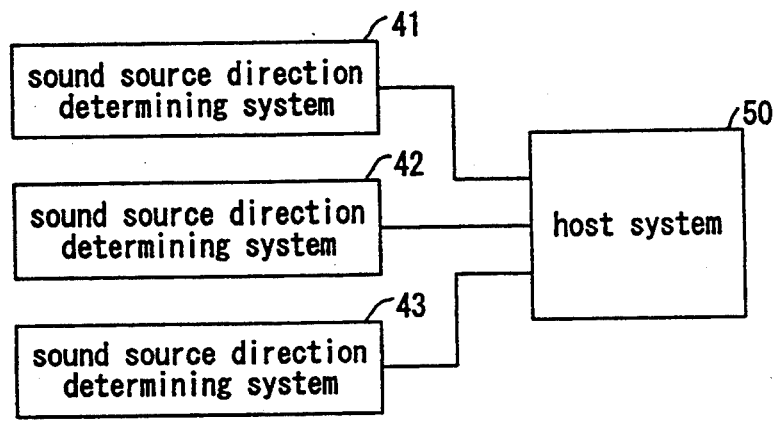
FIG. 12 is a block diagram showing the system for determining the position of aircraft in an airport.

FIG. 12 shows the overall structure of the system for locating the position of aircraft within the designated area 100 of the airport. The outputs of the sound source direction determining systems 41, 42 and 43 located in three different portions are transmitted to a host system 50 placed in a prescribed position of the airport via radio or wire, and the host system 50 determines and displays the position of the aircraft according to the outputs of the sound source direction determining systems 41, 42 and 43.

Figure 13:
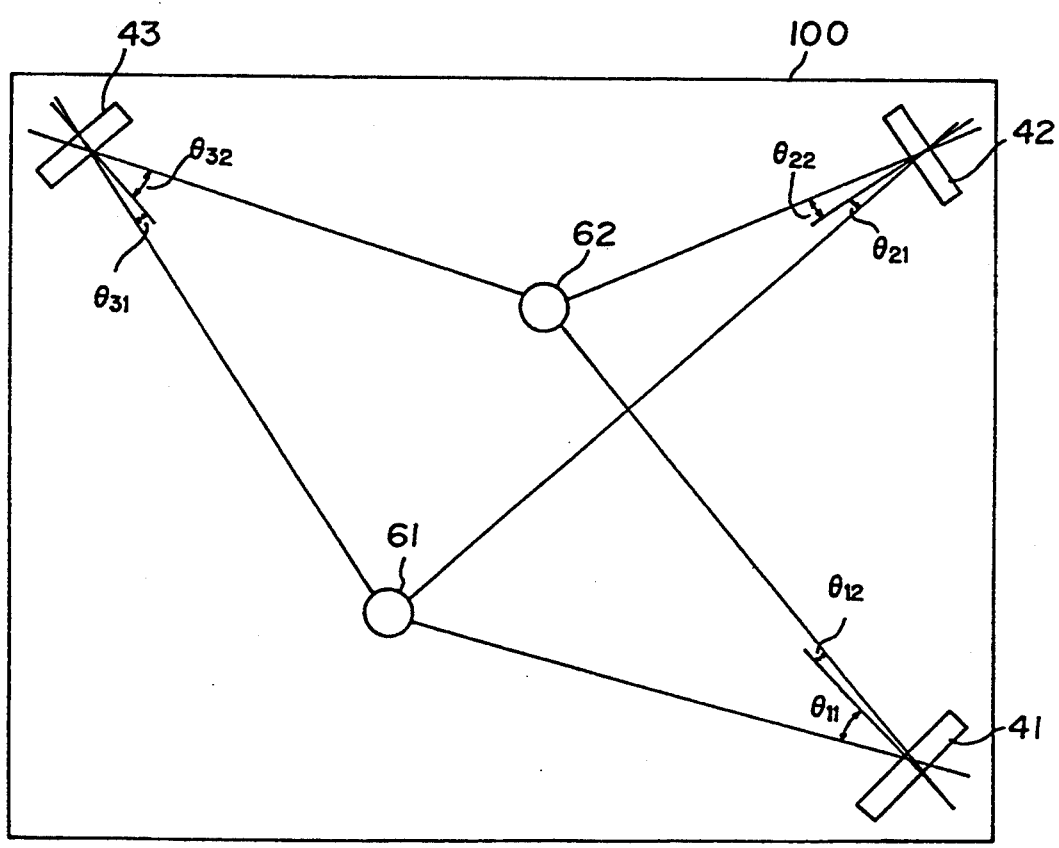
FIG. 13 is a schematic diagram showing the operation when there are two aircraft in the designated area of an airport.

FIG. 13 shows a case in which there are two aircraft 61 and 62 within the designated area 100 of the airport. In this case, the sound source direction determining systems 41, 42 and 43 identify not only the directions $\theta 11$, $\theta 21$ and $\theta 31$ of the aircraft 61 with respect to the sound source direction determining systems 41, 42 and 43, but also the directions $\theta 12$, $\theta 22$ and $\theta 32$ of the aircraft 62 with respect to the sound source direction determining systems 41, 42 and 43. The data on the directions $\theta 11$, $\theta 21$ and $\theta 31$, and the directions $\theta 12$, $\theta 22$ and $\theta 32$ transmitted from the sound source direction determining systems. 41, 42 and 43 is transmitted to a host system 50 placed in a prescribed position of the airport via radio or wire. The host system 50 determines and displays the positions of the aircraft according to the data on the directions $\theta 11$, $\theta 21$ and $\theta 31$, and the directions $\theta 12$, $\theta 22$ and $\theta 32$.

Figure 14:
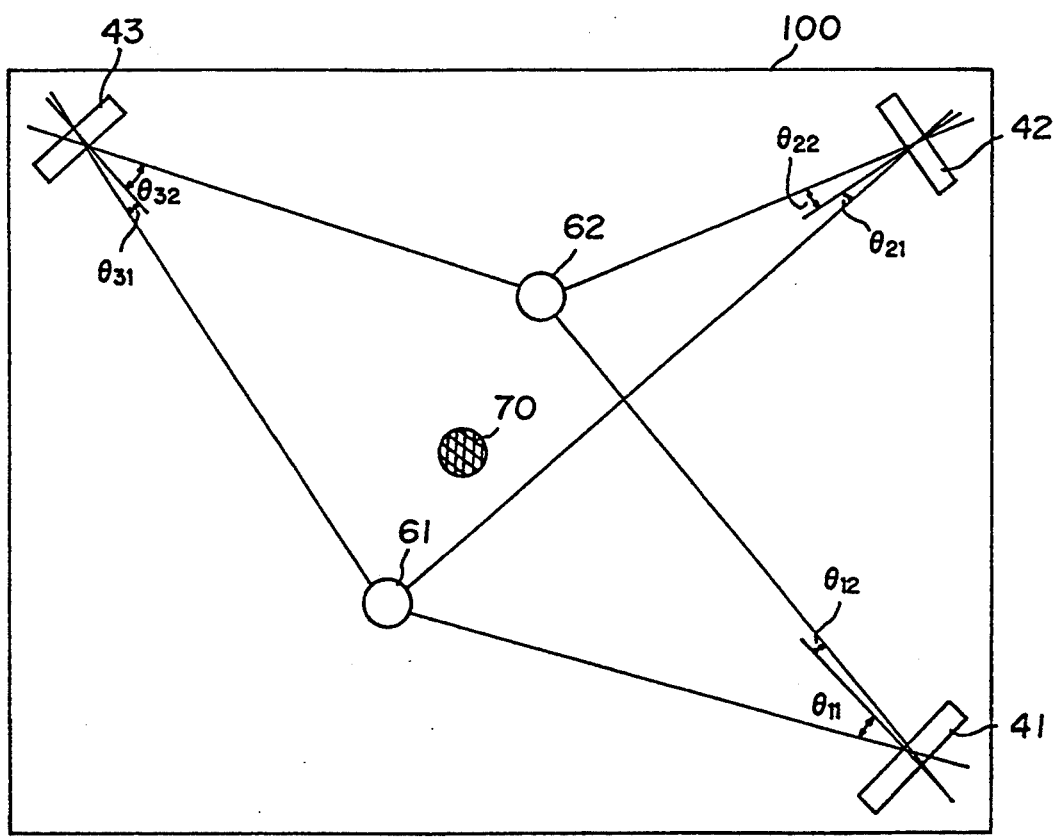
FIG. 14 is a schematic diagram showing yet another embodiment of the present system which includes a reference sound source for calibration at a known location in the designated area of the airport for calibrating the direction determined by the sound source determining system of the present invention.

FIG. 14 shows yet another embodiment of the present invention which includes a reference sound source 70 placed at a known location in the designated area of the airport for calibrating the directions determined by the sound source direction determining systems 41, 42 and 43. The sound source direction determining systems 41, 42 and 43 identify not only the directions of the aircraft 61 and 62 but also the direction of the reference sound source 70, and the outputs for the directions of the aircraft 61 and 62 are calibrated by using the output for the direction of the reference sound source 70. According to this structure, the changes in the identification accuracy of the sound source direction determining systems 41, 42 and 43 over time, as well as those due to the changes in the external environment can be dealt with.

The sound source direction determining systems 41, 42 and 43 were placed in three different locations within the designated area 100 of the airport in the embodiment illustrated in FIGS. 11 to 14, but identification of the position of aircraft is possible by using sound source direction determining systems placed only in two different locations when the environment is favorable. If the environment is not favorable, then, the sound source direction determining systems 41, 42 and 43 may be placed in four or more different locations.

In the above described embodiments, the acoustic sensors S0, S1, S2, S3, ..., and S-1, S-2, S-3, ... were arranged in a single row, but may be arranged two-dimensionally so that the location of the sound source may be three-dimensionally determined.

The above described embodiments pertained to the identification of the position of aircraft by detecting the acoustic signal produced from the sound source or the aircraft, but the identification of the position of aircraft can be also accomplished by providing vibration sensors underground, and determining the vibratory waves produced from the aircraft.

Thus, according to the present invention, the direction of a sound source is determined by using sound source direction determining means, comprising acoustic sensors arranged in an array at a prescribed interval for detecting an acoustic signal produced from the sound source, delay circuits connected the outputs of the acoustic sensors and having delay times which are different from one to a next by a unit time period, an adder circuit for adding up outputs of the delay circuits, and direction determining means for determining the direction of the sound source according to the unit time period which will maximize an output of the adder circuit, and the sound source direction determining means may be arranged in locations so that the position of the sound source is determined according to the outputs of the sound source direction determining means. Therefore, the present invention can accurately and economically identify the position of aircraft in an airport or the like.

Although the present invention has been described in terms of a specific embodiment thereof, it is possible to modify and alter details thereof without departing from the spirit of the present invention.

What we claim is:

1. A sound source determining system, comprising:
   a plurality of acoustic sensors arranged in an array at a prescribed interval for detecting an acoustic signal produced from a sound source;
   a plurality of variable delay circuits connected to outputs of said acoustic sensors and having delay times which are different from one to a next by a unit time period, each of said variable delay circuits being adapted to scan said unit time period;
   an adder circuit for adding up outputs of said variable delay circuits;
   an adaptive filter which removes influences of a specific spectral component selected from a plurality of spectral components produced from said adder circuit in association with said scanning of said unit time period by said variable delay circuits, by adaptively adding said specific spectral component to said other spectral components; and
   direction determining means for determining said direction of said sound source according to an output of said adaptive filter.

2. A sound source determining system according to claim 1, wherein said adaptive filter comprises:
   spectral separation unit for separating a plurality of spectral components from an output signal of said adder circuit according to said scanning by said variable delay circuits; and
   an adaptive filter unit for removing influences of a specific spectral component selected from a plurality of spectral components produced from said adder circuit in association with said scanning of said unit time period by said variable delay circuits, by adaptively adding said specific spectral component to said other spectral components.

3. A sound source determining system according to claim 2, wherein said adaptive filter removes said influences of said specific spectral component on said other spectral components by adding a product of a negative coefficient and said specific spectral component to said other spectral components.

4. A sound source determining system according to claim 2, wherein said adaptive filter unit removes influences of a plurality of specific spectral components selected from a plurality of spectral components produced from said adder circuit in association with said scanning of said unit time period by said variable delay circuits, by adaptively adding said specific spectral components to said other spectral components.

5. A sound source determining system according to claim 4, wherein said adaptive filter removes said influences of said specific spectral components on said other spectral components by adding products of said specific spectral components and associated negative coefficients to said other spectral components.

6. A sound source determining system according to claim 4, wherein said direction determining means identifies said direction of said sound source according to a maximum peak of said spectral components produced from said adaptive filter.

7. A sound source determining system according to claim 1, wherein said direction determining means identifies directions of a plurality of sound sources according a plurality of peaks of said spectral components produced from said adaptive filter.

8. A sound source determining system, comprising:
a plurality of sound source direction determining means arranged in different locations, each including:
a plurality of acoustic sensors arranged in an array at a prescribed interval for detecting an acoustic signal produced from a sound source;
a plurality of variable delay circuits connected to outputs of said acoustic sensors and having delay times which are different from one to a next by a unit time period, each of said variable delay circuits being adapted to scan said unit time period;
an adder circuit for adding up outputs of said variable delay circuits;
an adaptive filter which removes influences of a specific spectral component selected from a plurality of spectral components produced from said adder circuit in association with said scanning of said unit time period by said variable delay circuits, by adaptively adding said specific spectral component to said other spectral components; and
direction determining means for determining said direction of said sound source according to an output of said adaptive filter; and
host means for gathering data on said direction determined by said sound source direction determining means, and determining said position of said sound source according to this data.

9. A sound source determining system according to claim 8, wherein each of said sound source direction determining means identifies directions of a plurality of sound sources; and
said host means gathers data on said directions determined by said sound source direction determining means, and identifies said positions of said sound sources according to this data.

10. A sound source determining system according to claim 8, wherein each of said sound source direction determining means identifies said direction of a reference sound source placed at a prescribed location and said direction of said sound source to be determined; and
said host means gathers data on said direction of said sound source to be determined by said sound source direction determining means, corrects said direction of said sound source to be determined according to said determined direction of said reference sound source and identifies said position of said sound source according to said corrected direction.

* * * * *